UNITED STATES PATENT OFFICE.

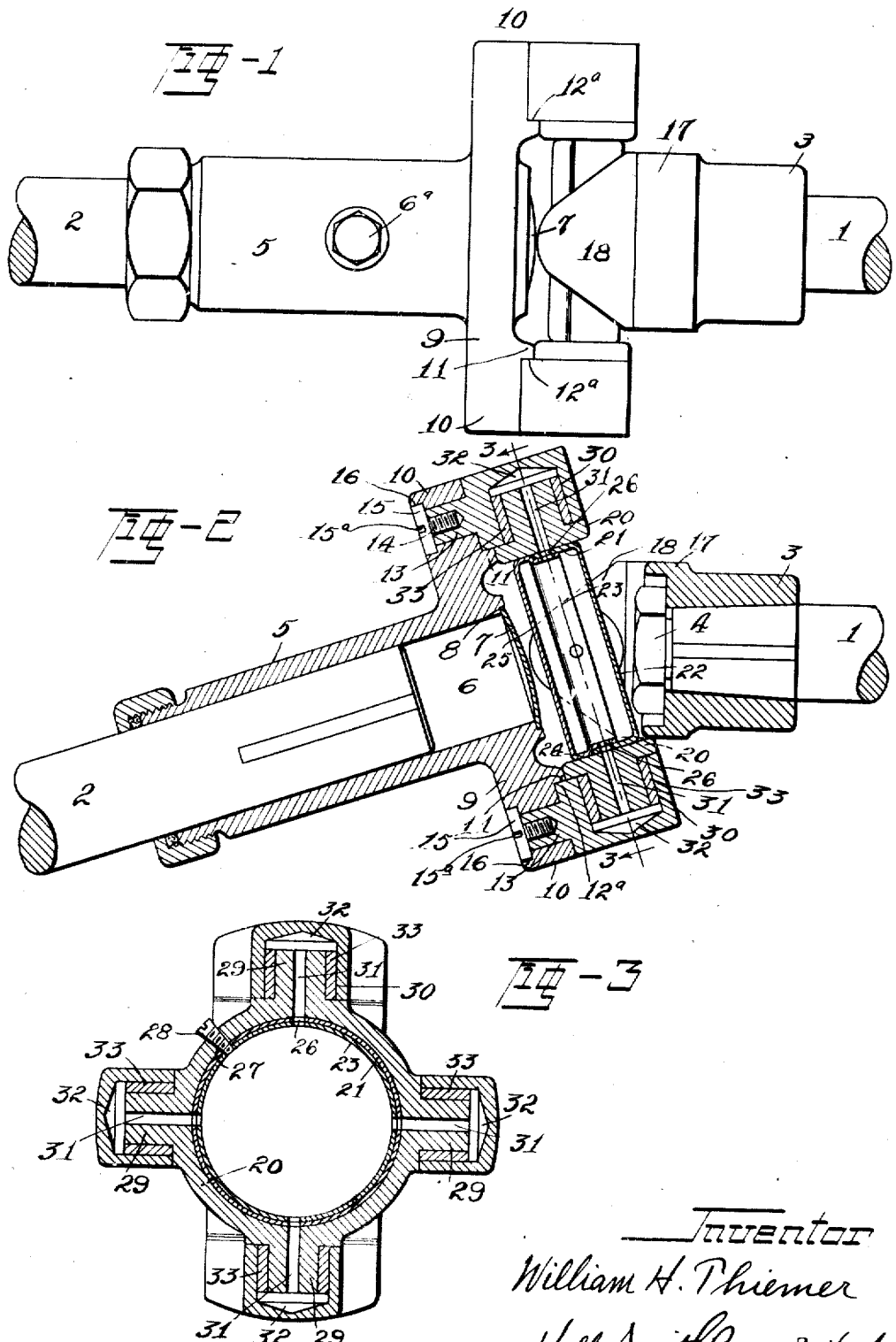

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,324,479.   Specification of Letters Patent.   Patented Dec. 9, 1919.

Application filed March 14, 1919. Serial No. 282,558.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints and has for its general object to produce a joint wherein the journals may be lubricated through centrifugal action in and through the employment of a central rotatable well which is novel in construction and simple and economical of production. I secure this result in and through the construction and arrangement of parts shown in the drawings, wherein Figure 1 represents a side elevation of a joint embodying my invention; Fig. 2 a central longitudinal sectional view through such joint, certain of the parts being shown in elevation; and Fig. 3 a sectional view corresponding to the line 3—3 of Fig. 2.

Describing by reference characters the various parts illustrated herein, 1 and 2 denote the end portions of shaft sections connected by my joint. The shaft section 1 is provided with a hub 3 which may be splined thereto, the hub being shown as provided with a tapered bore for the reception of the correspondingly tapered portion of the shaft end. At its extreme end, the shaft section is reduced and threaded for the reception of a nut 4 by means of which and the spline it is connected to the hub. The shaft section 2 is also splined to an elongated hub 5 which is shown as extending beyond the end of the shaft and providing therefor a lubricant well 6 having a filling opening closed by a removable plug 6ª and closed at its outer end by means of a concavo-convex plate 7 forced to a seat 8, said plate being preferably what is known to the trade as a "Welch plug". Extending transversely of the inner end of the hub is a supporting base or flange 9 having at each end thereof a flanged projection 10 which is faced off and machined to provide an accurate seat for the base of the bearing block, being provided with a shoulder 11 which is adapted to bear against and aline the adjacent side 12ª of the bearing block 12 with reference to a trunnion of the cross member. Each block is provided with a stud 13 projecting from the base thereof into and nearly through a bore in the outer end of the base flange 9, the stud making a snug fit with said bore and being internally threaded to receive a stud bolt 14. Each stud bolt 14 is provided with a cylindrical head 15 adapted, when the bolt is screwed home, to fit within an annular recess 16 formed within the bottom of each flanged projection of the base and constituting an enlargement of the bore thereof. The annular recesses 16 are preferably each of the same depth as the heads 15, whereby the bottoms of said heads will be substantially flush with the bottoms of their respective flanged projections. Each bolt head may be slotted, as shown at 15ª, for the reception of a screw driver and, when the bolts are set up, they may be retained in place by merely staking or peening the metal at the base of the flanged projections into one or both ends of each slot.

The hub 3 is provided with a base 17 similar to the base 9 and having seats for blocks 18 similar in construction and arrangement to the corresponding parts carried by the hub 5.

20 denotes a ring constituting a part of the cross member carrying the trunnions and connecting the two shaft ends through the bearing blocks.

Mounted within the ring 20 is a cup, the said cup comprising a section having a cylindrical side wall 21 and an integral closure 22, the cylindrical side wall being secured to the inner face of the ring, as by brazing. Coöperating with the first section is the second section of the cup, said second section comprising a cylindrical side wall 23 adapted to fit within the opposed side wall of the first section, the side wall of the second section being projected outwardly, as shown at 24, to bear against the inner surface of the ring, the walls 23 and 24 of the second section being united respectively to the wall 21 of the first section and the inner wall or surface of the ring, as by brazing. The second cup section is also provided with a closure 25 so that, when the two sections are assembled, a closed well is provided within the ring. The interior of this well is placed in communication with radial ports in the trunnions by means of alined openings 26 in the overlapping side walls, said openings registering with the trunnion ports.

For the purpose of filling the central well, thus provided within the cross member, the said ring and the overlapping side walls of the well members are provided with a filling opening 27 for lubricant, which opening is adapted to be closed by means of a plug 28 threaded thereinto.

Projecting from the cross member are the trunnions 29. Each trunnion is shown as shorter than the bore 30 provided therefor in its bearing block and is provided with a radial port 31, the inner end whereof communicates with the central well or cup through the openings 26. The outer end of each bore 31 terminates within the body of its bearing block, providing beyond the outer end of each trunnion a well 32 with which the outer end of a port 31 communicates. Surrounding each trunnion is a bushing 33.

The particular construction of the flanged bases, the bearing blocks, and the manner of mounting the journals in the same do not in their details constitute any part of my invention, the arrangement shown herein being substantially identical with that embodied in the application of Frederick W. Peters, Serial No. 275,503, filed February 7, 1919.

In operation, the lubricant well having been filled, the material therein will, through centrifugal action, be distributed outwardly through the radial ports 31 and into the wells 32, whence it will be distributed to the journals.

Having thus described my invention, what I claim is:

1. In a device of the character described, the combination of a rotatable member having trunnions projecting therefrom, bearings for said trunnions, a cup within and secured to the inner wall of said rotatable member, and ports communicating with said cup and serving to conduct lubricant from said cup to said bearings.

2. In a device of the character described, the combination of a rotatable member having trunnions projecting therefrom, each of said trunnions being provided with a radial port for the distribution of lubricant therethrough, bearings for said trunnions, and a cup within and secured to the inner wall of said rotatable member and having ports in its side communicating with the ports in the trunnions.

3. In a device of the character described, the combination of a rotatable member comprising a ring having trunnions projecting therefrom, bearings for said trunnions, ports leading to said bearings, and a lubricant well within said ring and adapted to supply lubricant by centrifugal action through said ports, the said well comprising a pair of cup members each having an end closure and an annular side wall, the side walls being united to each other and to the inner face of the ring, and said well having ports adapted to communicate with the first mentioned ports.

4. In a device of the character described, the combination of a rotatable member comprising a ring having trunnions projecting therefrom, bearings for said trunnions, each trunnion having a radial port extending therethrough and through the said ring, and a lubricant well within said ring and adapted to supply lubricant by centrifugal action through said ports, the said well comprising a pair of cup members each having an end closure and an annular side wall, the side walls being united to each other and to the inner face of the ring, and said well having ports adapted to communicate with the first mentioned ports.

5. In a device of the character described, the combination of a rotatable member comprising a ring having trunnions projecting therefrom, bearings for said trunnions, ports extending through said ring to said bearings, and a lubricant well within said ring and adapted to supply lubricant by centrifugal action through said ports, the said well comprising a pair of cup members each having an end closure and an annular side wall, the side wall of one of said cup members extending across the said ports and being united to the inner surface of said ring and the side wall of the other cup member being fitted within the opposed portion of the side wall of the first member and united thereto and also being united to the inner surface of said ring, the overlapping portions of the side walls of said cup members being provided with alined openings adapted to register with and form continuations of said ports.

In testimony whereof I hereunto affix my signature.

WILLIAM H. THIEMER.